US008447148B1

(12) United States Patent
Garcia et al.

(10) Patent No.: US 8,447,148 B1
(45) Date of Patent: May 21, 2013

(54) LATCHING MICRO OPTICAL SWITCH

(75) Inventors: Ernest J. Garcia, Albuquerque, NM (US); Marc A. Polosky, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 279 days.

(21) Appl. No.: 13/075,004

(22) Filed: Mar. 29, 2011

Related U.S. Application Data (60) Provisional application No. 61/318,572, filed on Mar. 29, 2010.

(51) Int. Cl.
*G02B 6/00* (2006.01)
*G02B 6/44* (2006.01)

(52) U.S. Cl.
USPC .......................................................... 385/16

(58) Field of Classification Search
USPC ............................................. 385/14, 15, 16
See application file for complete search history.

(56) References Cited

U.S. PATENT DOCUMENTS

| | | | |
|---|---|---|---|
| 5,239,599 A | 8/1993 | Harman | |
| 5,757,991 A | 5/1998 | Harman | |
| 6,385,365 B1 | 5/2002 | Rosele et al. | |
| 6,600,850 B1* | 7/2003 | Fan ................................ | 385/18 |
| 6,842,558 B2 | 1/2005 | Mitsuoka et al. | |
| 6,853,765 B1 | 2/2005 | Cochran | |
| 6,947,624 B2 | 9/2005 | Kubby et al. | |
| 6,968,100 B2 | 11/2005 | Kubby et al. | |
| 6,990,267 B2 | 1/2006 | Harman et al. | |
| 7,085,445 B2 | 8/2006 | Koh et al. | |
| 7,116,855 B2 | 10/2006 | Yang et al. | |
| 7,212,721 B2* | 5/2007 | Imai et al ...................... | 385/140 |
| 7,224,883 B2 | 5/2007 | Gulvin et al. | |
| 7,336,865 B2 | 2/2008 | Mita | |
| 7,927,023 B2* | 4/2011 | Moriarty et al. ................ | 385/53 |
| 2004/0223204 A1* | 11/2004 | Mao et al. ..................... | 359/210 |
| 2006/0110101 A1* | 5/2006 | Lin et al. ......................... | 385/16 |
| 2006/0127029 A1* | 6/2006 | Lin et al. ....................... | 385/140 |
| 2006/0291794 A1* | 12/2006 | Liu et al. ....................... | 385/140 |
| 2010/0209053 A1* | 8/2010 | Moriarty et al. ............... | 385/81 |

FOREIGN PATENT DOCUMENTS

DE 4241045 5/1994

OTHER PUBLICATIONS

Jankowski, N.R., MEMS-Based Optical Switch Design for Retonfigurable, Fault-Tolerant Optical Backplanes, in Proc.of the 6th Int.'l Conf. on Parallel Interconnects, Oct. 1999, pp. 149-156.
Md. Moinul Islam Bhuiyan, Design and Characteristics of Large Displacement Optical Fiber Switch, IEEE Journal of Quantum Electronics, vol. 41, No. 2, Feb. 2005, 242-249.
Cochran, K. R., High-power optical microswitch based on direct fiber actuation, Sensors and Actuators A 119 (2005) 512-519.
Garcia, E. J., Design and Development of a Latching Micro Optical Switch, DTIP of MEMS & MOEMS, Apr. 1-3, 2009, Rome, Italy, ISBN: 978-2-35500-009-6.

* cited by examiner

*Primary Examiner* — Akm Enayet Ullah
(74) *Attorney, Agent, or Firm* — Michael A. Beckett (57) ABSTRACT

An optical switch reliably maintains its on or off state even when subjected to environments where the switch is bumped or otherwise moved. In addition, the optical switch maintains its on or off state indefinitely without requiring external power. External power is used only to transition the switch from one state to the other. The optical switch is configured with a fixed optical fiber and a movable optical fiber. The movable optical fiber is guided by various actuators in conjunction with a latching mechanism that configure the switch in one position that corresponds to the on state and in another position that corresponds to the off state.

17 Claims, 6 Drawing Sheets

LATCHING MICRO OPTICAL SWITCH

CROSS-REFERENCE TO RELATED APPLICATIONS

This application claims the benefit of U.S. Provisional Application No. 61/318,572, filed Mar. 29, 2010.

GOVERNMENT RIGHTS

This invention was made with Government support under Contract No. DE-AC04-94AL85000 awarded by the U.S. Department of Energy. The Government has certain rights in the invention.

BACKGROUND OF THE INVENTION

1. Field of the Invention

The present invention relates in general to an optical switch, and in particular to controlling movement of optical fibers between an on position and an off position.

2. Description of Related Art

An optical switch should be reliable and accurately maintain itself in an on state and an off state when appropriate. This can present a challenge when the switch is used in extreme environments where shock, vibration, or other movement causes the switch to move and change states undesirably, such as in a moving vehicle or aircraft. For example, if a switch is on, an accidental bump may turn the switch off, and vice versa. An optical switch can be particularly susceptible to movement because optical fibers are very thin and flexible; they can easily be shifted, and thus aligned in an on position or misaligned in an off position unintentionally. Improving reliability of optical switches to withstand movement is desirable.

Furthermore, reliability of external power to optical switches also has an impact on the reliability of a switch. Optical switches rely on external power to operate; an interruption of power can cause a switch to be on when it should be off or off when it should be on. For example, an optical switch can require power to be in the actuate state (the switch is on) and when power is disconnected, it will automatically revert to the reset state (the switch is off). Therefore, considering an optical switch's dependence on external power is important for improving the reliability of a switch.

SUMMARY OF THE INVENTION

The present invention relates to a more reliable optical switch. The switch can operate in extreme environments without undesirably switching to a different state when bumped or otherwise moved. This is achieved by utilizing a latching mechanism that secures the switch's position in one configuration when on and in another configuration when off. The latching mechanism is made of a set of claws and flexures. The claws interact with a wedge-shaped element by securing it in place. The wedge-shaped element is integral to an actuator and corresponding arm that contacts a movable portion of an optical fiber to support and sustain the desired on or off position of the optical switch. Accordingly, bumps or other movement of extreme mechanical shock that might otherwise cause the thin and flexible optical fibers to shift (and therefore turn the switch on or off undesirably) would not do so in the present invention.

In addition, the optical switch is less reliant on external power. The switch requires just momentary pulses of power and only during a transition from off to on and on to off. The switch does not utilize external power to maintain its actuate state (when the switch is on) or reset state (when the switch is off). In other words, when this optical switch is on, it remains indefinitely on; likewise, when this optical switch is off, it remains indefinitely off. The latching mechanism helps secure the rest positions when the switch is powered off.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Numerous specific details of the invention are set forth in this text. However, embodiments of the invention may be practiced without these specific details. In other instances, some well-known circuits, connections, structures, and techniques have not been shown in detail so as not to distract from the reading of this invention. Those of ordinary skill in the art, with the included descriptions, will be able to implement appropriate functionality without undue experimentation. Reference in this text to an "embodiment" indicates that one embodiment may include such feature, but not every embodiment of the invention will necessarily include the feature. Furthermore, the invention need not include all features of all embodiments.

Figure 1:
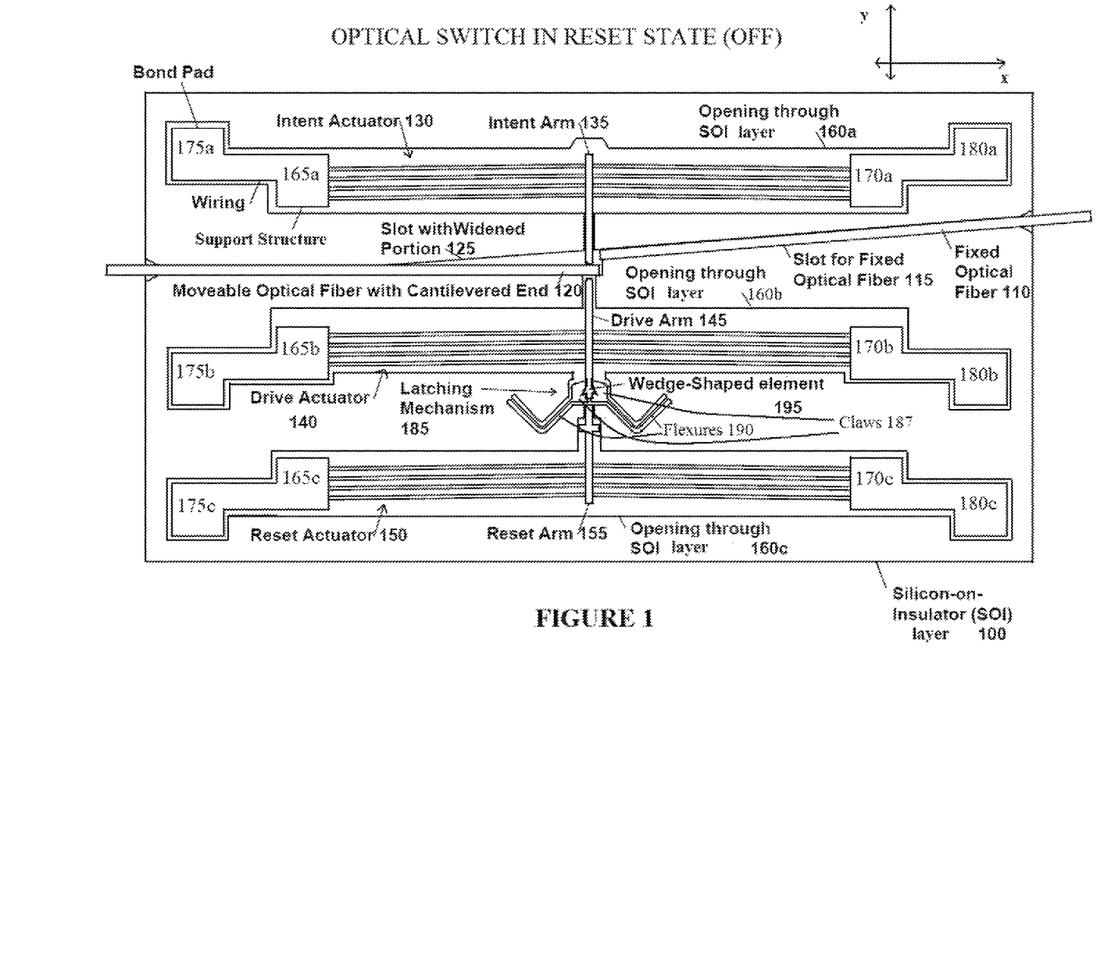
FIG. 1 shows an optical switch in a reset state such that the switch is off according to one embodiment of the invention.

FIG. 1 shows an optical switch in a reset state such that the switch is off according to one embodiment of the invention. The reset state is characterized by the movable optical fiber 120 not in alignment with the fixed optical fiber 110. The physical displacement causes an interruption in the connection and therefore means that the switch is off. When the fibers 110, 120 are unaligned, the movable optical fiber 120 is undeformed and straight. Slight deviations in alignment are tolerated in this invention. In this embodiment, three 4-beam actuators 130, 140, 150 and corresponding arms 135, 145, 155 operate in conjunction with a latching mechanism 185 to sustain the reset state. The actuators 130, 140, 150 are each unpowered at this time. No external power is used to maintain the optical switch's reset state.

The optical switch is fabricated from a single crystal silicon-on-insulator (SOI) material 100. Other semiconductors can be used. The thickness of the material 100 should generally match the diameter of the optical fibers 110, 120, e.g., 125 micron. Processing of an SOI wafer can be performed using Deep Reactive Ion Etching (DRIE) techniques, i.e., the Bosch Process. A polymer etch inhibitor is conformally deposited over the SOI wafer during deposition. The polymer deposits over the lithographically defined photoresist mask, the exposed silicon field, and along the sidewall of the area of removal. During sputtering, the polymer film can be removed from the silicon area and the top of the mask due to an acceleration of ions perpendicular to the surface of the SOI wafer. After the polymer is sputtered from the area, silicon is exposed and the chemical etch cycle is initiated. High densities of free radical fluorine are generated and allowed to diffuse to the silicon surface where they react with the silicon and initiate chemical etching in both the lateral and vertical directions. The aforementioned process is repeated until the desired depth of etching is reached. Alternatively to DRIE, other micro fabrication techniques can be utilized, e.g., surface micromachining, Lithographie, Galvanoformung, Abformung (Lithography, Electroplating, and Molding/LIGA), etc. As shown in FIG. 1, openings 160a, 160b, 160c are etched through the SOI layer 100 for actuators 130, 140, 150. Slots 115, 125 are etched through the SOI layer 100 for the fixed optical fiber 110 and the movable optical fiber 120. The fibers 110, 120 are secured in place by, for example, wire bond, solder, or epoxy, though the right end of the cantilevered movable fiber 120 is not secured down and is movable. In another embodiment, one or more holes are formed in the wedge-shaped element 195 and each of the claws 187 to assist in the release of oxide during fabrication.

Three thermal microactuators 130, 140, 150 and their corresponding arms 135,145, 155 are fabricated in their respective openings 160a, 160b, 160c and attached on the left and right with strong support structures (165a, 165b, 165c on the left and I 70a, 170b, 170c on the right) wired to bond pads (175a, 175b, 175c on the left and 180a, 180b, 180c on the right). It is noted that the bond pads 175a, 175b, 175c, 180a, 180b, 180c are electrically isolated from the bulk SOI via distinct channels. While this embodiment uses thermally-activated actuators, other types of linear actuators can also be used, e.g., electrostatic actuators or magnetic actuators, etc. Moreover, while this embodiment depicts 4-beam actuators, other types of actuators can also be used, e.g., 1-beam, 2-beam, or 3-beam actuators, etc. Furthermore, the beams may be of varying lengths for power consumption considerations, e.g., the beams of the intent actuator 130 and the drive actuator 140 can be longer than the beams of the rest actuator 150. Each of the three actuators 130, 140, 150 serves a separate purpose for the optical switch. When the actuators 130, 140, 150 are powered on (and expand), the arms 135, 145, 155 move upwards. When the actuators 130, 140, 150 are powered off, the arms 135, 145, 155 move back down to their rest positions (because when the actuators 130, 140, 150 cool down, they contract). It is noted that the actuators 130, 140, 150 are positioned such that all the arms 135, 145, 155 move in the same upward direction when the actuators 130, 140, 150 are powered on and the same downward direction from the actuators 130, 140, 150 are powered off. The term "upwards" and other descriptive terms of "upper," "middle," and "lower" are used in reference to the orientation of the switch as depicted in the figures along the y-axis as indicated in FIG. 1. In other words, the displacement direction caused by thermal activation is that the drive arm 145 and reset arm 155 move towards the intent arm 135 and the intent arm moves away from the drive arm 145 and reset arm 155.

The upper actuator is identified in FIG. 1 as the intent actuator 130. The intent actuator 130 is integral to an intent arm 135 that is the mechanism for upper contact of the movable optical fiber 120. The intent actuator 130 is unpowered in the optical switch's reset state (as is the case for all three actuators when the switch is not in transition, e.g., in the reset or actuate state). As depicted in FIG. 1, the intent arm 135 is resting on the movable optical fiber with a cantilevered end 120, which is undeformed (straight) and unaligned with the fixed optical fiber 110. Accordingly, if the optical switch is bumped, the thin and flexible movable optical fiber 120 that would normally have a tendency to move would not move upwards because the intent arm 135 is positioned to physically stop the fiber 120 from shifting upwards. Since the fiber 120 stays in place, it will not unintentionally change the optical switch to an actuate (on) state.

The middle actuator is identified in FIG. 1 as the drive actuator 140. The drive actuator 140 is integral to a drive arm 145 that is the mechanism for the underside contact of the movable optical fiber 120. The drive actuator 140 is unpowered in the switch's reset state. The movable optical fiber 120 is physically blocked from shifting downwards by the sidewall of the SOI layer and may or may not be in contact with the drive arm 145. Thus, with the intent arm 135 in place on one side of the movable optical fiber 120 and the drive arm 145 in place on the other side of the movable optical fiber, the movable optical fiber 120 would not shift in either direction when bumped. While one end of the drive arm 145 comes into contact with the movable optical fiber 120, the other end of the drive arm 145 is integral to a wedge-shaped element 195 that interacts with a latching mechanism 185, comprised of a set of claws 187 and elastic flexures 190. In the optical switch's reset state, the wedge-shaped element 195 is positioned in between the claws 187 of the latching mechanism 185. The actuators 13, 140, 150 are designed to be very stiff and do not displace unless driven by external power. Therefore, any mechanical shocks of the optical switch do not result in the movable fiber 120 being displaced. The shape of the wedge-shaped element 195 as illustrated is just one example; the wedge-shaped element 195 can be otherwise shaped in another protruding form so long as it can be sufficiently latched by a latching mechanism 185 (which claws 187 would be accordingly shaped in a form complementary to the wedge-shaped element 195).

The lower actuator is identified in FIG. 1 as the reset actuator 150. The reset actuator 150 is integral to a reset arm 155 that is the mechanism for lower contact of the claws 187 of the latching mechanism 185 when needed. The reset actuator 150 is unpowered in the switch's reset state.

Figure 2:
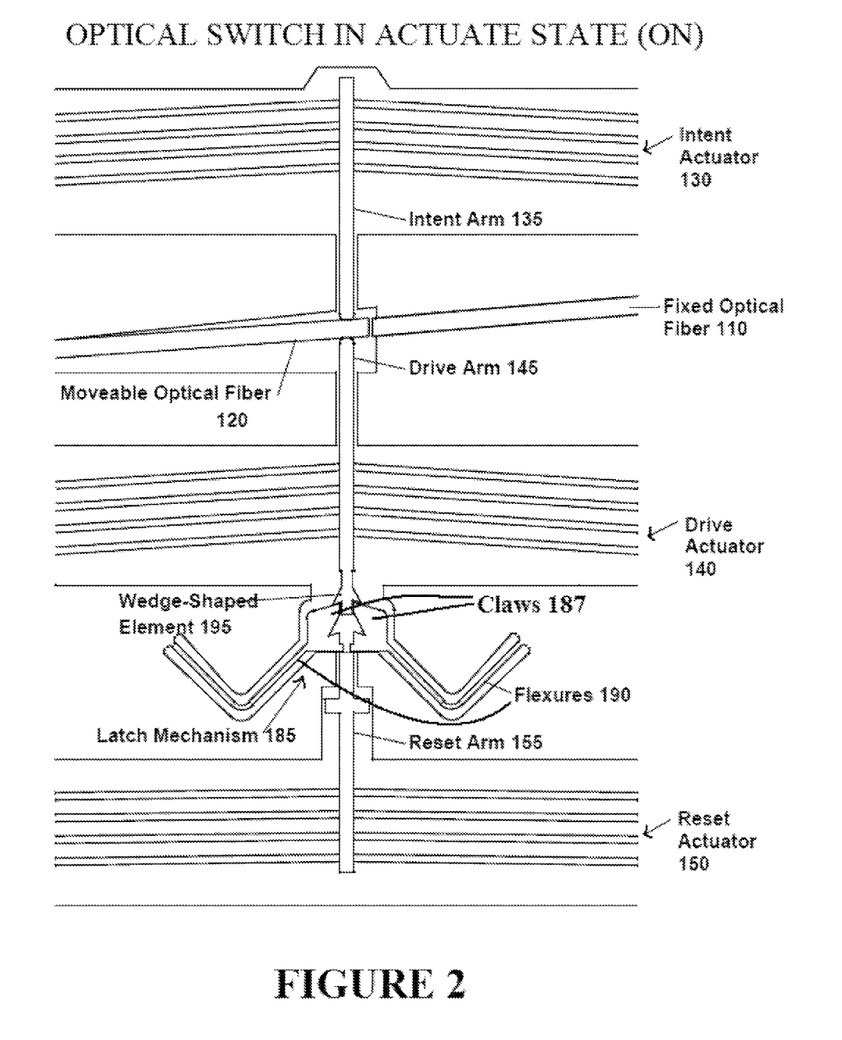
FIG. 2 shows an optical switch in an actuate state such that the switch is on according to one embodiment of the invention.

FIG. 2 shows an optical switch in an actuate state such that the switch is on according to one embodiment of the invention. All the components of the optical switch in FIG. 2 are the same as those in FIG. 1. However, the view of the optical switch in FIG. 2 is zoomed in to the middle section and omits the support structures, wiring, and bond pads shown in FIG. 1 for purposes of simplicity. The actuate state is characterized by the movable optical fiber 120 in alignment with the fixed optical fiber 110. When the movable optical fiber 120 is aligned with the fixed optical fiber 110, the movable optical fiber 120 is deformed as the end is pushed up by the drive arm 145. A deviation in alignment can be tolerated. The connection through the fibers 110, 120 is maintained by the alignment and means that the optical switch is on. In this embodiment, three 4-beam actuators 130, 140, 150 and corresponding arms 135, 145, 155 operate in conjunction with a latching mechanism 185 to sustain the reset state. The actuators 130, 140, 150 are each unpowered at this time. No external power is used to maintain the optical switch's actuate state. This is in contrast to an optical switch where an actuator needs to be continuously activated to hold a fiber in place for the switch to be on, i.e., without power to an actuator, the switch will automatically revert from on to off.

In the switch's actuate state, the intent arm 135 and the drive arm 145 act as physical barriers to keep the movable optical fiber 120 in place. However, unlike in the switch's reset state, the movable fiber 120 is held in alignment with the fixed optical fiber 110. The difference in position of the movable fiber 120 is a result of the wedge shaped element 195 (that is integral to the drive arm 145) resting on top of the claws 187 rather than between the claws 187 when in the configuration of the switch's reset state of FIG. 1. The return force from the drive actuator 140 and drive arm 145 (when the drive actuator 140 contracts) at the wedge-shaped element 195 causes the claws 187 to press down against the SOI layer sidewall barrier towards the reset arm 155, transferring the load from the drive actuator 140 through the latch mechanism 185 and to the sidewall of the SOI layer just below the latch mechanism 185. This return force is due to the intent actuator 130 and drive actuator 140 not being allowed to return to their equilibrium (or initial rest) state as the actuators 130, 140 contract. The latch mechanism 185 prevents the drive arm 145 from traveling any further down and the movable optical fiber 120 prevents the intent arm 135 from traveling any further down. It is also noted that the intent actuator 130 is in its equilibrium state when the optical switch is in the reset state. The drive arm 145 and intent arm 135 do not shift upwards because the drive actuator 140 and the intent actuator 130, respectively, are not powered on and therefore do not move in that direction.

Figure 3:
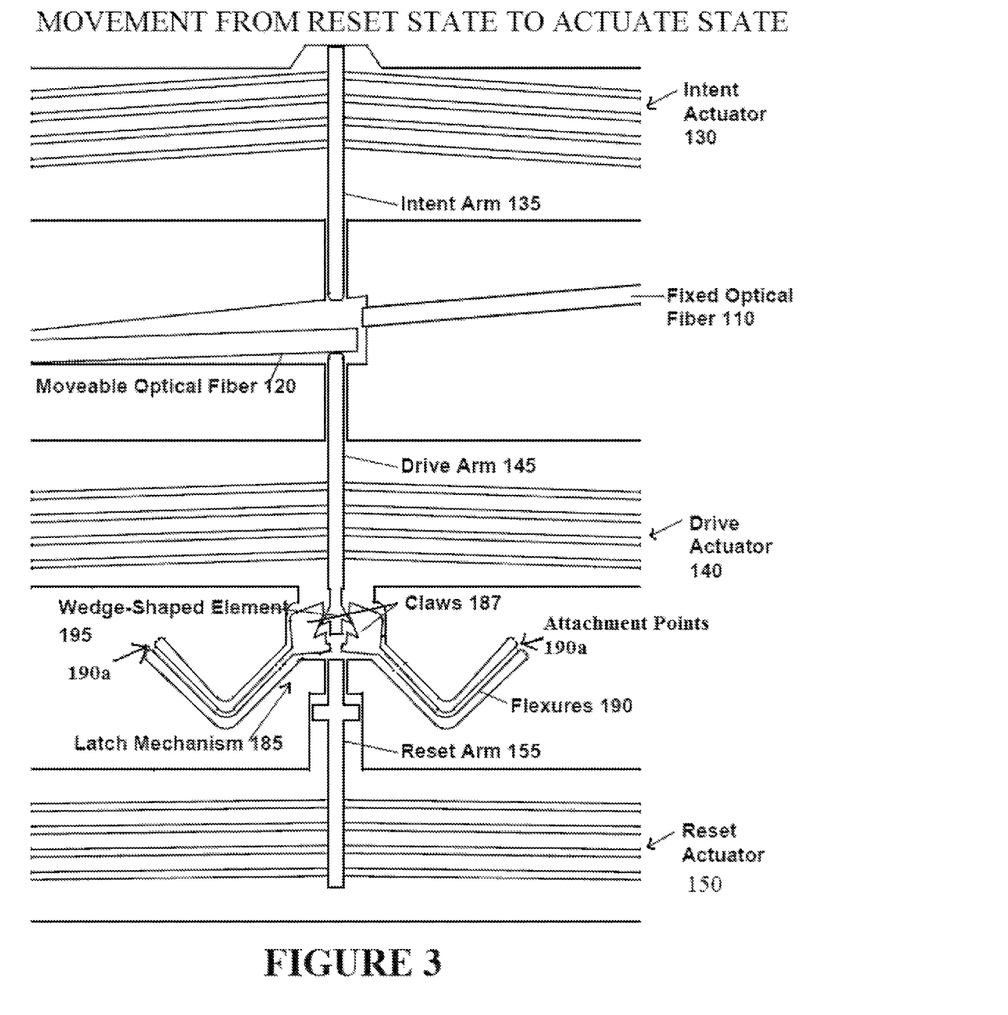
FIG. 3 depicts an optical switch during transition from a reset state to an actuate state according to one embodiment of the invention.

FIG. 3 depicts an optical switch during transition from a reset state, such that the switch is off, to an actuate state, such that the switch is on, according to one embodiment of the invention. The snapshot of the optical switch in the midst of transition presents a view where the intent actuator 130 has been activated and the drive actuator 140 has just begun to be activated. The transition process of the optical switch from the reset state to the actuate state is described in FIG. 4.

In the view of the switch shown in FIG. 3, the intent actuator 130 has been thermally activated and has therefore moved upwards. Due to the movement of the intent actuator 130, the intent arm 135 has been retracted upwards until it hit the sidewall of the SOI layer. The intent arm 135 no longer blocks the movable optical fiber 120 from moving upwards. The drive actuator 140 has just been thermally activated and therefore is in the midst of displacing upwards. The drive actuator 140 causes the drive arm 145 to move upwards, meanwhile pushing the movable optical fiber 120 with the upper end. The other end of the drive arm 145 is integral to a wedge-shaped element 195 that moves upwards along with the movement of the drive arm 145. The movement of the wedge-shaped element 195 opens the claws 187 of the latch mechanism 185 so that the wedge-shaped element 195 can be released from the claws 187. The latch mechanism 185 moves at two attachment points 190*a* of the flexures 190 when opening. When the claws 187 are open, the flexures 190 elastically deform. When the wedge-shaped element 195 is fully released from the claws 187, the flexures 190 return to their original position and the claws 187 close again. While the flexures 190 are shaped as shown to maintain the opening (and subsequently, closing) movement of the latch mechanism, other shapes of flexures can alternatively be used to accomplish the same purpose. During the entirety of the transition of the optical switch from the reset state to the actuate state, the reset actuator 150 need not be activated (and therefore the reset arm 155 does not move).

Furthermore, a second set of pivot points can be introduced to the flexures 190 to increase the stiffness of the flexures. These pivot points can be located at various points of the flexures 190. As the flexures 190 deform, these additional pivot points come into play resulting in a stiffer suspension for the latch mechanism 185. These additional pivots can be created by modifying the SOI sidewalls adjacent to the flexures, i.e., fabricate bumps on the sidewalls to function as pivots.

Figure 4:
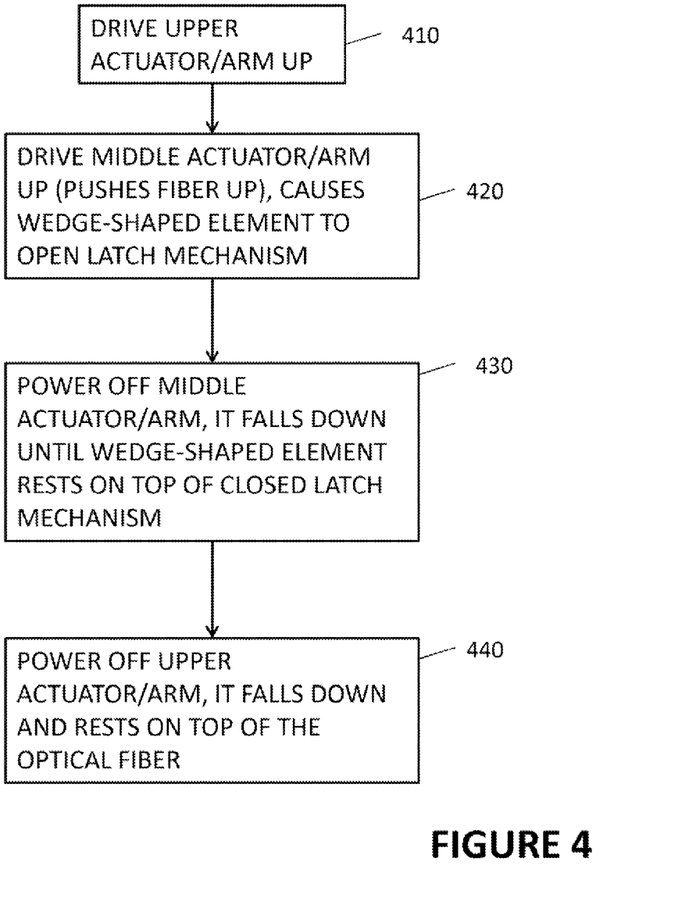
FIG. 4 illustrates a flow diagram of an optical switch during the transition of FIG. 3 according to one embodiment of the invention.

FIG. 4 illustrates a flow diagram of an optical switch during the transition of FIG. 3 according to one embodiment of the invention. The operations of FIG. 4 will be described with reference to the embodiment of FIG. 3. However, it should be understood that the operations of this flow diagram can be performed by embodiments of the invention other than those discussed with reference to FIG. 3, and the embodiments discussed with reference to FIG. 3 can perform operations different than those discussed with reference to the flow diagram. FIG. 4 describes the process of the optical switch transitioning from a reset (off) state to an actuate (on) state.

Starting with operation 410, the optical switch begins in a reset state. In this reset state, the movable optical fiber 120 is not aligned with the fixed optical fiber 110. The upper actuator 130 is thermally activated and displaces in the upwards direction (i.e., the y-axis), thus driving the upper arm 135 upwards until it hits the sidewall of the etched SOI layer. Without the upper arm 135 in place, there is now space above the movable optical fiber 120 to allow the fiber 120 to move. At operation 420, the middle actuator 140 is thermally activated and displaces the middle arm 145 upwards. FIG. 3 depicts a snapshot of the switch while the middle arm 145 is driving upwards and thus pushing the movable fiber 120 upwards. The movement of the middle arm 145 brings the wedge-shaped element 195 upwards and causes the claws 187 to open until the wedge-shaped element 195 is fully released from the claws 187 and the movable optical fiber 120 is physically stopped by the sidewall of the SOI layer. In another embodiment, the movable fiber 120 does not come into contact with this sidewall. This point is slightly above the point where the movable optical fiber 120 would be completely in line with the fixed optical fiber 110. After the wedge-shaped element 195 is fully released from the claws 187, the latch mechanism 185 pivots at its attachment points 190*a* of the flexures 190 back down to the original resting position so that the claws 187 are closed again. It is noted that as the wedge-shaped element 195 has been released from the latch mechanism 185, the claws 187 are closed but do not contain the wedge-shaped element 195 therein.

At this point in time, both the upper actuator 130 and the middle actuator 140 are powered on and have displaced until stopped by a physical barrier. Now that the wedge-shaped element 195 is fully released from the claws 187, external power to these actuators 130, 140 can be removed. At operation 430, the middle actuator 140 is powered off, causing the middle arm 145 to descend down until the wedge-shaped element 195 at the end of the middle arm 145 is in contact with the top of the claws 187. When the wedge-shaped element 195 rests on top of the claws 187, the bottom of the claws 187 are pressed against the sidewalls of the SOI layer, which acts as a mechanical stop. The movable optical fiber 120 rests on top of the middle arm 145 and aligns with the fixed optical fiber 110. This alignment facilitates the actuate state of the optical switch. At operation 440, the upper actuator 130 is powered off, which causes the upper arm 135 to fall back down until it is physically stopped by the top of the movable optical fiber 120. Operation 440 can occur concurrently with operation 430, i.e., the middle actuator 140 and the upper actuator 130 can be powered off at the same time. At this point in time, none of the actuators are powered (the lower actuator was not powered on during this transition) and the configuration of the elements secures the movable optical fiber 120 in its place, aligned with the fixed optical fiber 110 This is the actuate state of the optical switch.

Figure 5:
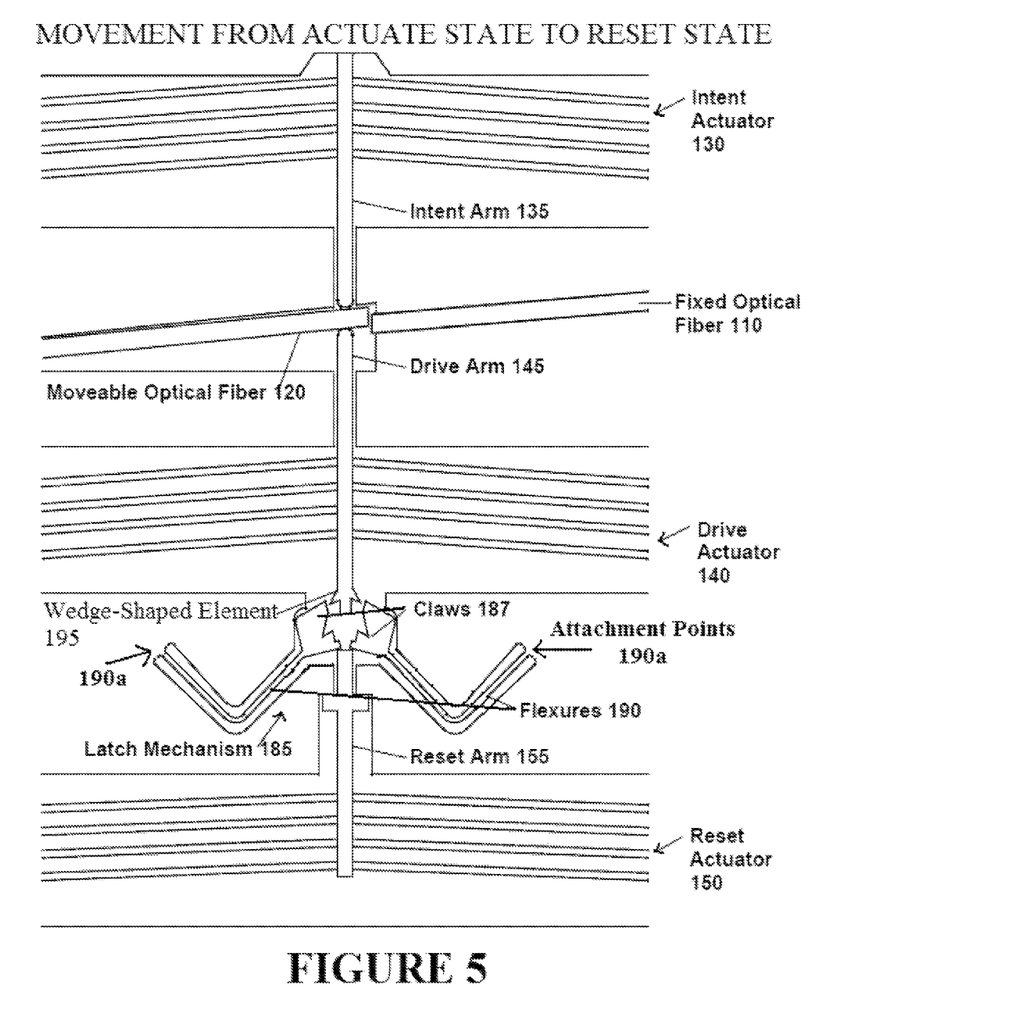
FIG. 5 depicts an optical switch during transition from an actuate state to a reset state according to one embodiment of the invention.

FIG. 5 depicts an optical switch during transition from an actuate state, such that the switch is on, to a reset state, such that the switch is off, according to one embodiment of the invention. The snapshot of the optical switch in the midst of transition presents a view where all three actuators 130, 140, 150 have been activated. The transition process of the optical switch from the actuate state to the reset state is described in FIG. 6.

In the snapshot view during the transition illustrated in FIG. 5, the intent actuator 130 has been powered on and therefore the intent arm 135 is fully retracted upwards until it has come into contact with the sidewall of the SOI layer, which acts as a mechanical stop. The drive actuator 140 has also been powered on and its drive arm 145 is also fully retracted upwards. The top end of the drive arm 145 has pushed the movable optical fiber 120 upwards until the fiber comes into contact with the sidewall of the SOI layer. This point is slightly past the point where the movable optical fiber 120 is in complete alignment with the fixed optical fiber 110. The drive arm 145 travels this far to give the wedge-shaped element 195 enough clearance above the latch mechanism 185 for the claws 187 to open. The reset actuator 150 has also been powered on and its reset arm 155 has pushed the latch mechanism 185 open by moving the claws 187 open. The latch mechanism 185 moves at the attachment points 190a of the flexures 190. During the transition all three actuators 130, 140, 150 are activated at some point, but when the transition is over, the actuators 130, 140, 150 are powered off and maintain their positions just before being powered off.

Figure 6:
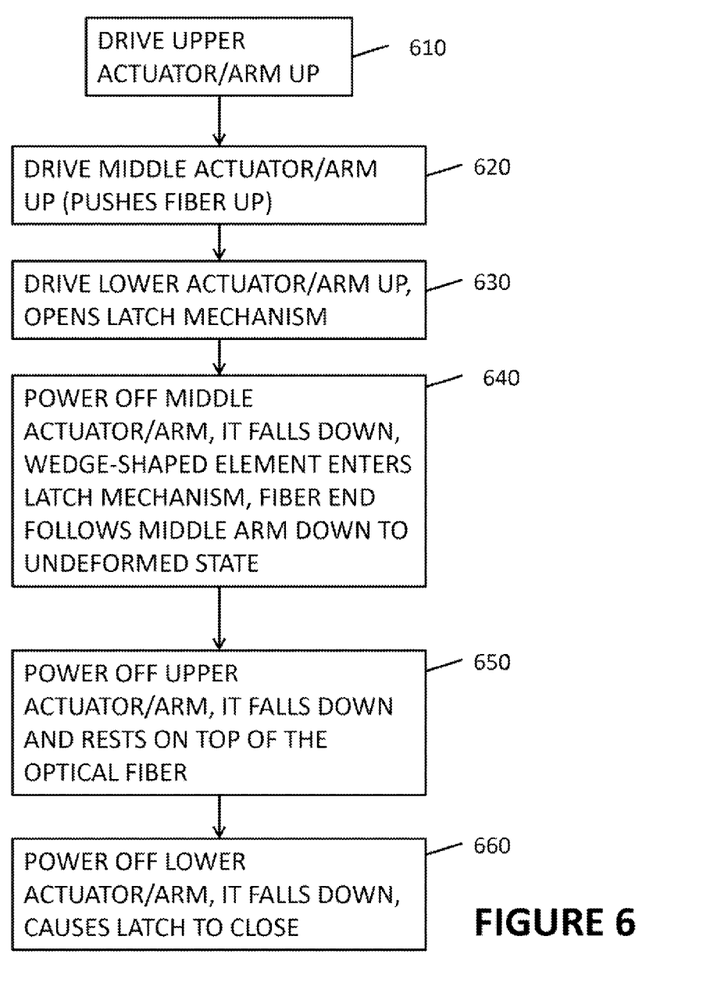
FIG. 6 illustrates a flow diagram of an optical switch during the transition of FIG. 5 according to one embodiment of the invention.

FIG. 6 illustrates a flow diagram of an optical switch during the transition of FIG. 5 according to one embodiment of the invention. The operations of FIG. 6 will be described with reference to the embodiment of FIG. 5. However, it should be understood that the operations of this flow diagram can be performed by embodiments of the invention other than those discussed with reference to FIG. 5, and the embodiments discussed with reference to FIG. 5 can perform operations different than those discussed with reference to the flow diagram. FIG. 6 describes the process of the optical switch transitioning from an actuate (on) state to a reset (off) state.

Operation 610 begins with the switch in the actuate state. In this state, the movable optical fiber 120 is aligned with the fixed optical fiber 110. The upper actuator is thermally activated so that it displaces upwards, driving the upper arm 135 up until it reaches the sidewall of the SOI layer. With the upper arm 135 out of the way, the movable optical fiber 120 has room to move upwards. At operation 620, the middle actuator 140 is thermally activated, causing the middle arm 145 to move upwards, pushing the movable optical fiber 120 upward until it reaches the sidewall of the SOI layer. In another embodiment, operation 610 and 620 can occur concurrently, that is, the upper actuator 130 and the middle actuator 140 can be powered on at the same time. Now that the wedge-shaped element 195 that is at the bottom end of the middle arm 145 is no longer resting on top of the latch mechanism 185, the lower actuator 150 is powered on (operation 630). This causes the lower arm 155 to push the claws 187 from the bottom, such that the latch mechanism 185 pivots at the attachment points 190a of the flexures 190. The claws 187 open until they are physically precluded from opening any further by the sidewalls of the SOI layer. In another embodiment, the claws 187 do not open far enough to come into contact with these sidewalls, rather the claws 187 open as far as displaced by the lower arm 155 (as the lower actuator 150 is powered on).

All three actuators 130, 140, 150 are powered on at this point in time. Now that the claws 187 are open wide enough, the middle actuator 140 is powered off so that the middle arm 145 falls back down to its rest position (operation 640). The wedge-shaped element 195 that is at the bottom end of the middle arm 145 enters the open claws 187. The movable optical fiber 120 end moves down with the middle arm 145 to return to its undeformed state. At operation 650, the upper actuator 130 is powered off; the upper arm 135 falls and rests on top of the movable optical fiber 120. At operation 660, the lower actuator 150 is powered off so that the lower arm 155 moves down out of the way of the latch mechanism 185 and the claws 187 return back to their equilibrium state. The powering off of the actuators 130, 140, 150 occur somewhat concurrently timed with each other. The optical switch is now in the reset state and is maintained in that state by the positions of the elements locked in place.

While the flow diagrams in the figures show a particular order of operations performed by certain embodiments of the invention, it should be understood that such order is just one example. For example, other embodiments of the invention may perform the operations in a different order, combine certain operations, and/or overlap certain operations other than the embodiments explicitly set forth in the description.

While the invention has been described in terms of several embodiments, those with ordinary skill in the art will recognize that the invention is not limited to the embodiments described and can be practiced with modification and alteration within the spirit and scope of the claims. The description is thus to be regarded as illustrative instead of limiting.

What is claimed is:

1. An optical switch comprising:
a first optical fiber;
a second optical fiber movably positioned in alignment with the first optical fiber relative to optical transmission across the first optical fiber and the second optical fiber;
a first actuator integral to a first arm, the first arm is positioned at a first side of the second optical fiber;
a second actuator integral to a second arm, the second arm having:
a first end positioned at a second side of the second optical fiber; and
a second end integral to a protruding element;
a latching mechanism operatively coupled with the protruding element; and
a third actuator integral to a third arm, the third arm is positioned at a side of the latching mechanism opposite from the second arm.

2. The optical switch of claim I, wherein when the second optical fiber is in alignment with the first optical fiber, the optical transmission through the first optical fiber and the second optical fiber is enabled, and when the second optical fiber is not in alignment with the first optical fiber, the optical transmission is interrupted.

3. The optical switch of claim 1, wherein the first optical fiber is fixed in position.

4. The optical switch of claim 1, wherein at least one of the first actuator, the second actuator, or the third actuator is a thermal actuator.

5. The optical switch of claim 1, wherein the first actuator, the second actuator, and the third actuator are not activated when the optical switch is on and when the optical switch is off.

6. The optical switch of claim 1, wherein the protruding element is positioned inside the latching mechanism when the first optical fiber and the second optical fiber are not optically aligned.

7. The optical switch of claim 1, wherein the protruding element rests on top of the latching mechanism when the first optical fiber and the second optical fiber are optically aligned.

8. The optical switch of claim 1, wherein the latching mechanism including:
   a set of claws; and
   a set of flexures integral to the set of claws, the set of flexures define a set of attachment points when the set of claws open and close.

9. The optical switch of claim 8, wherein the latching mechanism is symmetric.

10. The optical switch of claim 8, wherein each flexure in the set of flexures is L shaped.

11. The optical switch of claim 1, wherein the first actuator, the second actuator, and the third actuator drive the first arm, the second arm, and the third arm, respectively, in a same direction when the first actuator, the second actuator, and the third actuator are activated.

12. The optical switch of claim 1, wherein external power is transmitted to activate the first actuator, the second actuator, or the third actuator only during transition of the optical switch from on to off and off to on.

13. The optical switch of claim 1, wherein when the optical switch is on, the second optical fiber is precluded from shifting towards the first actuator by the first arm and the second actuator by the second arm.

14. The optical switch of claim 1, wherein the protruding element is wedge-shaped.

15. The optical switch of claim 1, wherein at least one of the first actuator, the second actuator, or the third actuator has a first set of beams parallel to each other to the left of the first arm, the second arm, and the third arm, respectively, and a second set of beams parallel to each other to the right of the first arm, the second arm, and the third arm, respectively.

16. The optical switch of claim 15, wherein the optical switch is on, the first actuator is not in its equilibrium state, the second actuator is not in its equilibrium state, and the third actuator is in its equilibrium state.

17. The optical switch of claim 15, wherein the optical switch is off, the first actuator, the second actuator, and the third actuator are in their respective equilibrium states.

\* \* \* \* \*